Dec. 31, 1963    R. SOLISCH    3,116,359
FRONT ATTACHMENT FOR OPTICAL OBJECTIVES
Filed March 4, 1960    2 Sheets-Sheet 1

INVENTOR:
Rudolf Solisch
BY Karl F. Ross
Agent

Dec. 31, 1963   R. SOLISCH   3,116,359
FRONT ATTACHMENT FOR OPTICAL OBJECTIVES
Filed March 4, 1960   2 Sheets-Sheet 2

INVENTOR:
Rudolf Solisch
BY   Karl F. Ross
Agent

United States Patent Office 3,116,359
Patented Dec. 31, 1963

3,116,359
FRONT ATTACHMENT FOR OPTICAL OBJECTIVES
Rudolf Solisch, Gottingen, Germany, assignor to Isco Optische Werke, G.m.b.H., Gottingen-Weende, Germany, a corporation of Germany
Filed Mar. 4, 1960, Ser. No. 12,746
Claims priority, application Germany Mar. 7, 1959
3 Claims. (Cl. 88—57)

My present invention relates to a front attachment for optical objectives such as those of photographic and particularly cinematographic cameras.

In order to enable the selection of a wide variety of image scales, it has been the custom in the motion-picture industry to utilize an assortment of camera objectives staggered in focal length by, for example, 5-mm. steps. The necessity of making and storing such variety of objectives is an inconvenience which the present invention aims to minimize.

If an afocal system of small magnification ratio is placed in front of a given objective, it will have the effect of somewhat increasing or, if inverted, reducing the size of the projected image so as to result in a change of image scale equivalent to a change in the focal length of the objective by, for example, ±5%. I have found that, in accordance with this invention, the change in image scale and therefore in magnification ratio may be varied over a relatively wide range, e.g. from about 92% to about 98% and from about 102% to about 108%, if the components of the afocal system are made relatively displaceable over a distance which is small compared with the individual focal lengths of these components so that the afocal character of the combination is substantially maintained. With a camera objective having a focal length of 70 mm., for example, the attachment according to the invention affords changes in image scale equivalent to focal lengths ranging approximately between 64 mm. and 76 mm.

As will be apparent from the foregoing, the attachment is so designed that in its median position the change in image scale is either 95% or 105% (depending upon its orientation relative to the main objective) so that its linear magnification must be $1:(1\pm0.05)$; within the limits of adjustability indicated, this magnification ratio varies by a value of approximately ±3%. Stated more generally, the linear magnification ratio is variable by a factor $\pm k$ on either side of a median value $1:(1+k)$ where $k_{max}$ (the maximum value of $k$) is approximately ±0.05.

The desired image-scale variation within a range of approximately ±10% can be realized, in accordance with a more specific feature of my invention, by the use of a dispersive component and a collective component whose focal lengths differ in their absolute values by only a few percent, preferably not more than 5%, these two components being relatively displaceable over a distance ranging from near zero to substantially more than the difference in their absolute focal lengths, preferably at least twice this difference. Advantageously, the two components are simple or compound lenses of plano-concave and plano-convex configuration, respectively, turning their flat sides toward each other. Instead of a compound lens, however, each component (or either of them) may also be a pair of oppositely refractive lenses separated by a small air space. In the case where each component consists of a doublet or of a pair of closely spaced singlets of different refractive indices, the radius of the concave outer surface of the first component and the radius of the convex outer surface of the second component may be the same, the difference in their focal lengths being obtained through suitable dimensioning of the curvatures of their internal surfaces. In all instances it is preferred that each component have the overall configuration of a thick lens, with a combined thickness substantially equal to or greater than the aforementioned focal-length difference which, in such cases, may be as low as approximately 2½% of the focal length of either component for a change in image scale of the magnitude described above.

Since the principal objective lies in a field of substantially parallel light rays to the rear of the afocal attachment, its distance from the components of the attachment is not critical. Thus, the adjustment of the air space between these components may be effected in any convenient manner through the movement of either or both of them.

The invention will be described in greater detail with reference to the accompanying drawing in which.

Figure 1:
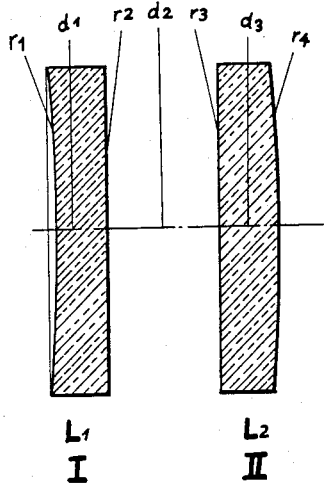
FIGS. 1, 2 and 3 are diagrammatic views of three types of attachment embodying the invention.

In FIG. 1 the two components of the attachment have been designated I and II, consisting respectively of a plano-concave lens $L_1$ with radii $r_1$, $r_2$ and thickness $d_1$ and of a plano-convex lens $L_2$ with radii $r_3$, $r_4$ and thickness $d_3$. The two lenses, facing each other with their plane surfaces $r_2$ and $r_3$, are separated by a variable distance $d_2$.

In the following Table 1 I have indicated representative numerical values, in millimeters, for the radii $r_1$ to $r_4$ and the thicknesses and separations $d_1$ to $d_3$; it will be understood that only the relative magnitudes of these parameters are relevant and that any arbitrary units could be chosen. The table also gives the refractive indices $n_d$ and the Abbé numbers $\nu$ for the lenses $L_1$ and $L_2$.

Table 1

| Lens | Radii | Thicknesses and Air Spacings | $n_d$ | $\nu$ |
|---|---|---|---|---|
| I { $L_1$ | $r_1 = -406.76$ | $d_1 = 10.00$ | 1.51871 | 63.96 |
|  | $r_2 = \infty$ | $d_2 = 22.67$ | air space | (variable) |
| II { $L_2$ | $r_3 = \infty$ | $d_3 = 12.00$ | 1.51871 | 63.96 |
|  | $r_4 = -426.04$ |  |  |  |

The air space $d_2$ can be varied from 4 to 55 mm. to change the apparent focal length of the principal objective (not shown in FIG. 1) by a factor of 0.98 to 0.92, this factor being 0.95 for the value of $d_2$ given in the table and shown in the drawing.

If the system of FIG. 1 is inverted, with its negative lens $L_1$ facing the objective and its positive lens $L_2$ lying in front, the apparent focal length of the principal objective is changed by a factor of 1.05 in the median position ($d_2$ equals 22.67 mm.), this factor being variable from 1.08 to 1.02 upon a change in the lens spacing between 4 and 55 mm.

Figure 2:
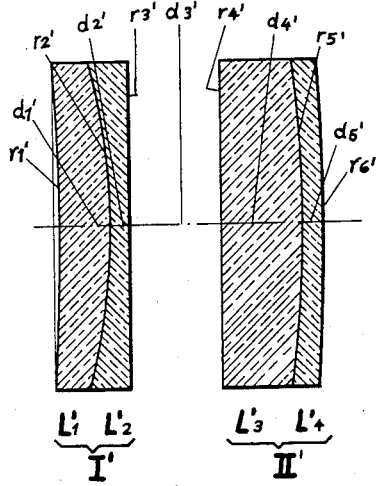

In the modified system of FIG. 2 there are shown two components I' and II' each in the form of a compound lens. The dispersive component I' consists of a meniscus-shaped positive lens $L_1'$ (radii $r_1'$, $r_2'$ and thickness $d_1'$) cemented onto a plano-concave lens $L_2'$ (radii $r_2'$, $r_3'$ and thickness $d_2'$). The collective component II' consists of a plano-convex lens $L_3'$ (radii $r_4'$, $r_5'$ and thickness $d_4'$) cemented onto a meniscus-shaped negative lens $L_4'$ (radii $r_5'$, $r_6'$ and thickness $d_5'$). The variable air space between the two components has been designated $d_3'$.

Reference is made to the following Table 2 for representative values of the parameters of the system of FIG. 2.

Table 2

| Lens | | Radii | Thicknesses and Air Spacings | $n_d$ | $\nu$ |
|---|---|---|---|---|---|
| I' | L₁' | $r_1' = -450.00$ | $d_1' = 10.00$ | 1.51871 | 63.96 |
| | L₂' | $r_2' = -131.70$ | $d_2' = 4.00$ | 1.53430 | 48.66 |
| | | $r_3' = \infty$ | $d_3' = 18.60$ | air space | (variable) |
| | | $r_4' = \infty$ | | | |
| II' | L₃' | | $d_4' = 16.00$ | 1.53430 | 48.66 |
| | L₄' | $r_5' = -270.00$ | $d_5' = 4.00$ | 1.51871 | 63.96 |
| | | $r_6' = -450.00$ | | | |

The air space $d_3'$ is variable from 4 to 51 mm. to change the apparent focal length of the principal objective in the aforedescribed manner.

Figure 3:
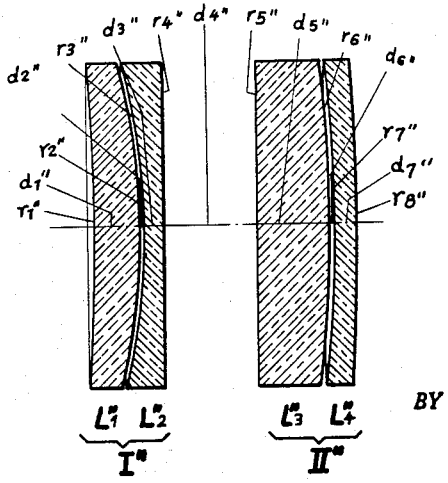

The system of FIG. 3 is identical in its external dimensions with that of FIG. 2 and equivalent to it. The dispersive component I'' now consists of two separate lenses L₁'' (radii $r_1''$, $r_2''$ and thickness $d_1''$) and L₂'' (radii $r_3''$, $r_4''$ and thickness $d_3''$) separated by a small air space $d_2''$; the collective component II'' similarly consists of two lenses L₃'' (radii $r_5''$, $r_6''$ and thickness $d_5''$) and L₄'' (radii $r_7''$, $r_8''$ and thickness $d_7''$) separated from each other by a small air space $d_6''$. The variable air space in FIG. 3 has been designated $d_4''$.

The following Table 3 gives the parameters for the system of FIG. 3.

Table 3

| Lens | | Radii | Thicknesses and Air Spacings | $n_d$ | $\nu$ |
|---|---|---|---|---|---|
| I'' | L₁'' | $r_1'' = -450.00$ | $d_1'' = 9.90$ | 1.51871 | 63.96 |
| | | $r_2'' = -131.70$ | $d_2'' = 0.10$ | air space | |
| | | $r_3'' = -131.70$ | $d_3'' = 4.00$ | 1.53430 | 48.66 |
| | L₂'' | $r_4'' = \infty$ | $d_4'' = 18.60$ | air space | (variable) |
| | | $r_5'' = \infty$ | $d_5'' = 15.90$ | 1.53430 | 48.66 |
| II'' | L₃'' | $r_6'' = -270.00$ | $d_6'' = 0.10$ | air space | |
| | | $r_7'' = -270.00$ | $d_7'' = 4.00$ | 1.51871 | 63.96 |
| | L₄'' | $r_8'' = -450.00$ | | | |

It will be noted from Tables 2 and 3 that the outer radii $r_1'$ and $r_6'$ as well as $r_1''$ and $r_8''$ are equal to each other.

Figure 4:
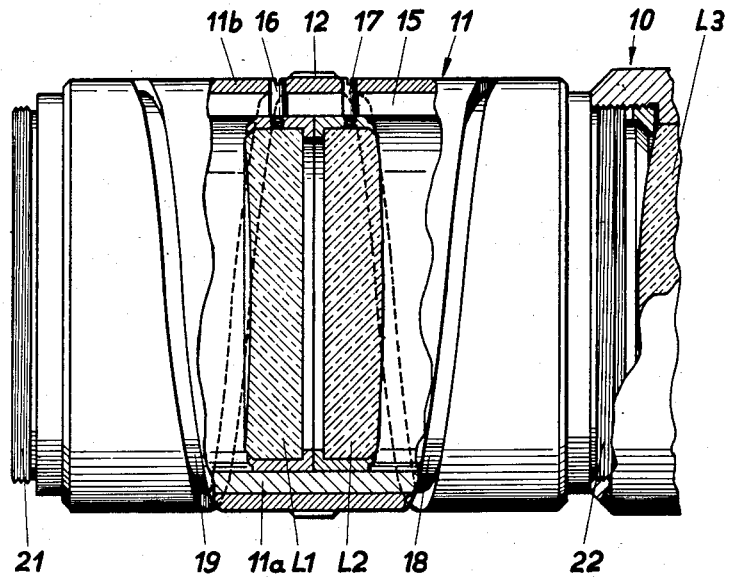
FIG. 4 is a side-elevational view, partly in section, of an actual attachment secured to a cinematographic camera.
Figure 5:
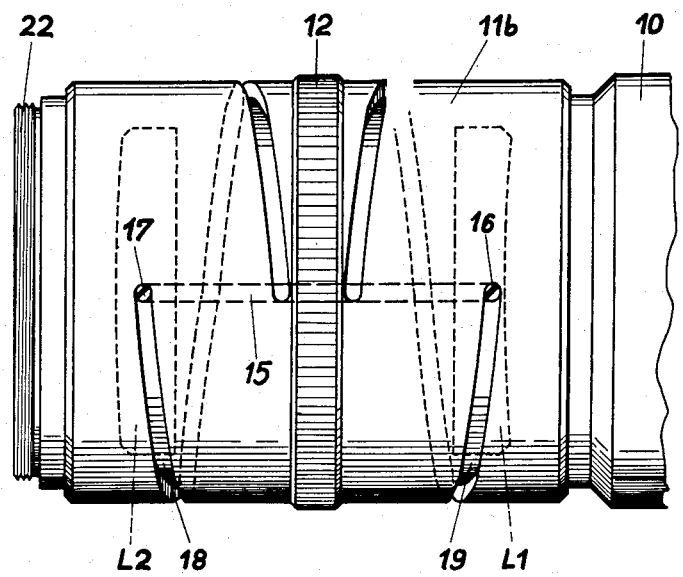
FIG. 5 is a view similar to FIG. 4 but with the attachment reversed.

In FIGS. 4 and 5 I have shown a camera 10 with a principal objective, schematically represented by a lens L₃, to which a tubular support 11 for the lenses L₁, L₂ can be reversibly attached. It will be understood that lenses L₁ and L₂ in FIGS. 4 and 5 are equally representative of the lens combinations of the components I', II' and I'', II'' in FIGS. 2 and 3.

The support 11 for the reversible attachment comprises an inner tube 11a and an outer tube 11b. Outer tube 11b is rotatably journaled on inner tube 11a between two threaded flanges 21 and 22 of the latter and is provided with a knurled ring 12 to facilitate its rotation. This tube has two helical grooves 18 and 19 receiving respective pins 16 and 17 which pass from lenses L₁ and L₂ through an axially extending slot 15 in inner tube 11a. Thus, upon relative rotation of the two tubes, the lenses may be displaced from their adjacent position (FIG. 4) to their widely separated position (FIG. 5). The threads 21, 22 serve to attach the support 11 in either of two relatively reversed positions, as shown in FIGS. 4 and 5, to the housing of camera 10.

It will be apparent that my invention is not limited to either the specific parameters of Tables 1–3 or the particular mechanical construction illustrated in FIGS. 4 and 5, except as limited by the appended claims.

I claim:

1. A front attachment for an optical objective, comprising a dispersive component, a collective component forming a substantially afocal system with said dispersive component, a reversible support for said components having coupling means for selectively attaching it to the objective with either of said lenses facing said objective, and adjustment means for varying the relative spacing of said components on said support over a range within which said system maintains its substantially afocal character while having a linear magnification ratio of median value $1:(1+k)$ variable within the limits of said range by a factor equal at most to $\pm k$, $k$ having an absolute value of less than 0.1 and varying in sign with the position of said reversible support relative to said objective, said dispersive component L₁ and said plano-collective component L₂ having radii of curvature $r_1$ to $r_4$, thicknesses and variable separation $d_1$ to $d_3$, refractive indices $n_d$ and Abbé numbers $\nu$ substantially as given in the following table:

| Lens | Radii | Thicknesses and Air Spacings | $n_d$ | $\nu$ |
|---|---|---|---|---|
| L₁ | $r_1 = -406.76$ | $d_1 = 10.00$ | 1.51871 | 63.96 |
| | $r_2 = \infty$ | $d_2 = 22.67$ | air space | (variable) |
| L₂ | $r_3 = \infty$ | $d_3 = 12.00$ | 1.51871 | 63.96 |
| | $r_4 = -426.04$ | | | |

2. A front attachment for an optical objective, comprising a dispersive component, a collective component forming a substantially afocal system with said dispersive component, a reversible support for said components having coupling means for selectively attaching it to the objective with either of said lenses facing said objective, and adjustment means for varying the relative spacing of said components on said support over a range within which said system maintains its substantially afocal character while having a linear magnification ratio of median value $1:(1+k)$ variable within the limits of said range by a factor equal at most to $\pm k$, $k$ having an absolute value of less than 0.1 and varying in sign with the position of said reversible support relative to said objective, said dispersive component being a doublet composed of lens members L₁', L₂' and said collective component being a doublet composed of lens members L₃', L₄' having radii of curvature $r_1'$ to $r_6'$, thicknesses and separations $d_1'$ to $d_5'$, refractive indices $n_d$ and Abbé numbers $\nu$ substantially as given in the following table:

| Lens | | Radii | Thicknesses and Air Spacings | $n_d$ | $\nu$ |
|---|---|---|---|---|---|
| I' | L₁' | $r_1' = -450.00$ | $d_1' = 10.00$ | 1.51871 | 63.96 |
| | L₂' | $r_2' = -131.70$ | $d_2' = 4.00$ | 1.53430 | 48.66 |
| | | $r_3' = \infty$ | $d_3' = 18.60$ | air space | (variable) |
| | | $r_4' = \infty$ | | | |
| II' | L₃' | | $d_4' = 16.00$ | 1.53430 | 48.66 |
| | L₄' | $r_5' = -270.00$ | $d_5' = 4.00$ | 1.51871 | 63.96 |
| | | $r_6' = -450.00$ | | | |

3. A front attachment for an optical objective, comprising a dispersive component, a collective component forming a substantially afocal system with said dispersive component, a reversible support for said components having coupling means for selectively attaching it to the objective with either of said lenses facing said objective, and adjustment means for varying the relative spacing of said components on said support over a range within which said system maintains its substantially afocal character while having a linear magnification ratio of median value $1:(1+k)$ variable within the limits of said range by a factor equal at most to $\pm k$, $k$ having an absolute value of less than 0.1 and varying in sign with the position of said reversible support relative to said objective, said dispersive component consisting of two closely air-spaced members $L_1''$, $L_2''$ of plano-concave overall configuration and said collective component consisting of two closely air-spaced members $L_3''$, $L_4''$ of plano-convex overall configuration having radii of curvature $r_1''$ to $r_8''$, thicknesses and separations $d_1''$ to $d_7''$ and Abbé numbers $\nu$ substantially as given in the following table:

| | Lens | Radii | Thicknesses and Air Spacings | $n_d$ | $\nu$ |
|---|---|---|---|---|---|
| I'' | $L_1''$ | $r_1''=-450.00$ | $d_1''=9.90$ | 1.51871 | 63.96 |
| | | $r_2''=-131.70$ | $d_2''=0.10$ | air space | |
| | $L_2''$ | $r_3''=-131.70$ | $d_3''=4.00$ | 1.53430 | 48.66 |
| | | $r_4''=\infty$ | $d_4''=18.60$ | air space | (variable) |
| II'' | $L_3''$ | $r_5''=\infty$ | $d_5''=15.90$ | 1.53430 | 48.66 |
| | | $r_6''=-270.00$ | $d_6''=0.10$ | air space | |
| | $L_4''$ | $r_7''=-270.00$ | $d_7''=4.00$ | 1.51871 | 63.96 |
| | | $r_8''=-450.00$ | | | |

References Cited in the file of this patent

UNITED STATES PATENTS

| | | |
|---|---|---|
| 1,790,232 | Flora | Jan. 27, 1931 |
| 2,184,018 | Ort | Dec. 19, 1939 |
| 2,235,364 | Gramatzki | Mar. 18, 1941 |
| 2,798,411 | Coleman | July 9, 1957 |
| 2,800,052 | Bechtold et al. | July 23, 1957 |

FOREIGN PATENTS

| | | |
|---|---|---|
| 1,082,780 | France | June 23, 1954 |
| 118,466 | Germany | Mar. 9, 1901 |
| 817,455 | Great Britain | July 29, 1959 |